Feb. 19, 1935. C. B. WOODWARD ET AL 1,991,645
PROCESS OF DISTRIBUTING SOLIDS
Filed Sept. 17, 1931 3 Sheets-Sheet 1
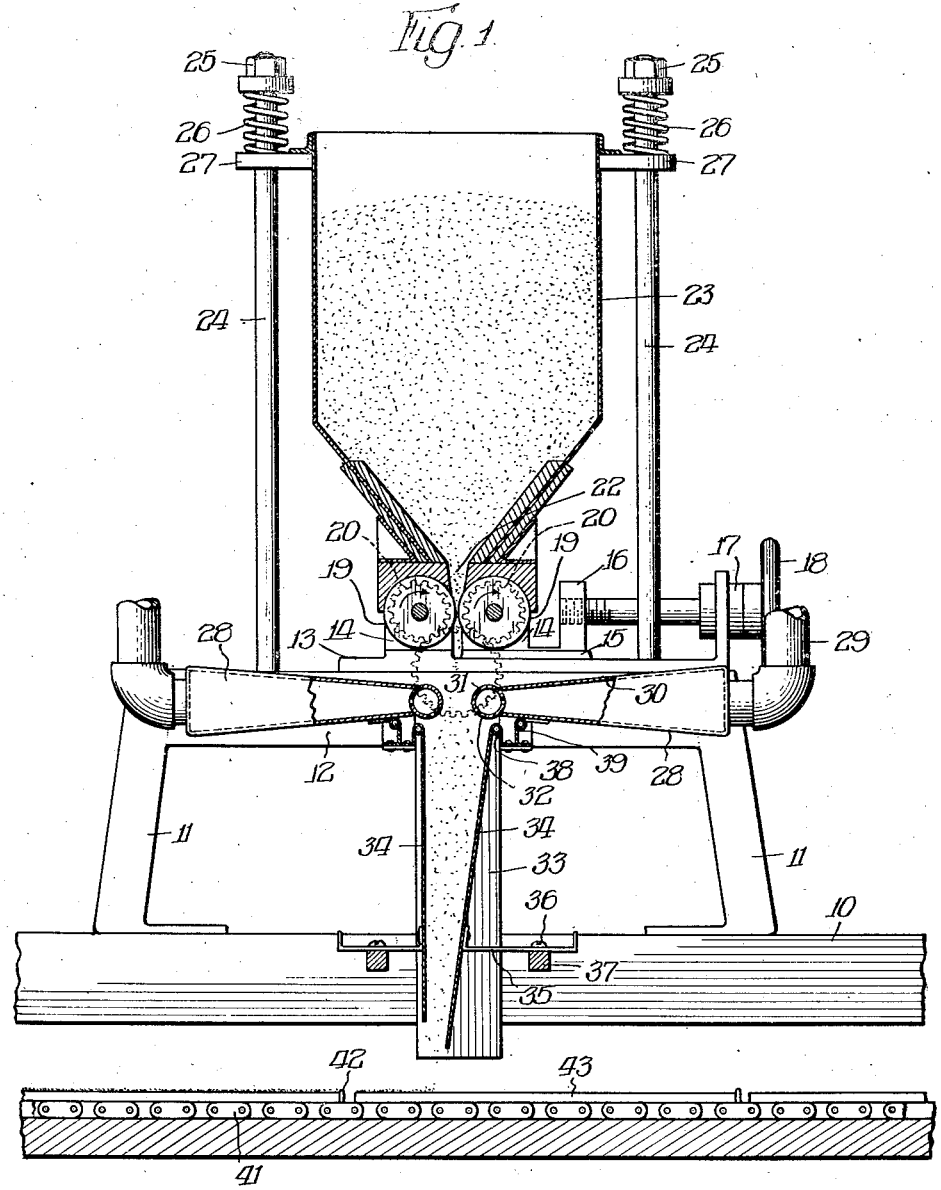
Inventors:
Cornelius B. Woodward,
Robert B. Keefe,
Edwin W. Colt,

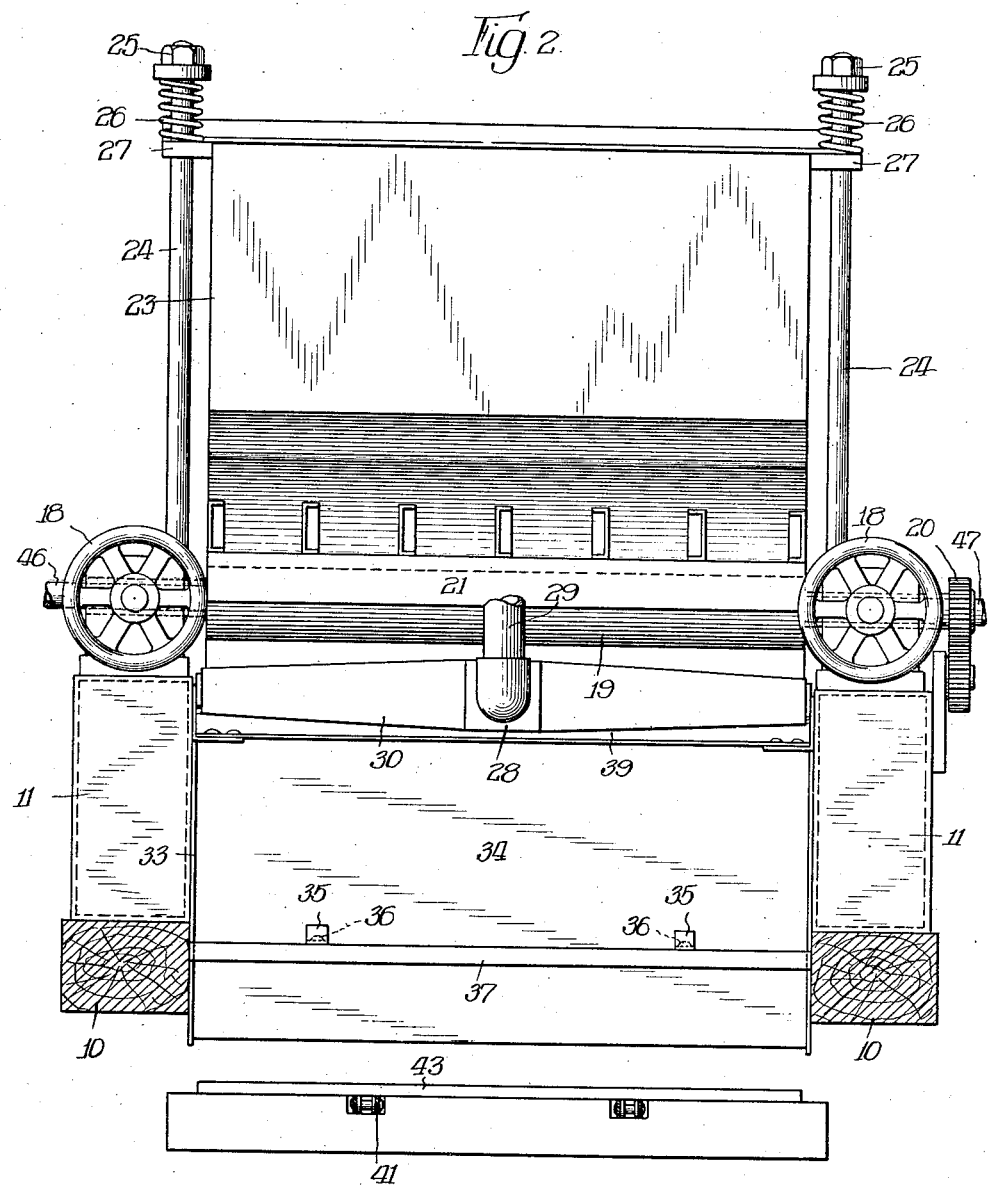

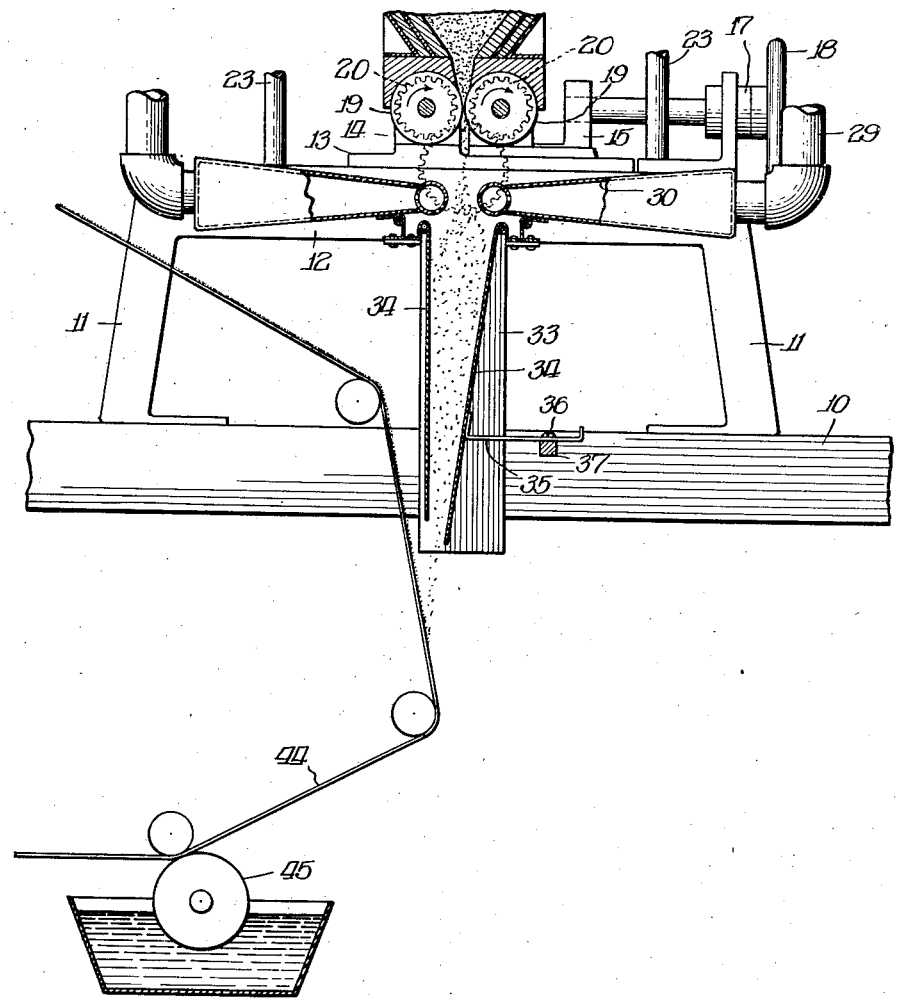

Patented Feb. 19, 1935

1,991,645

UNITED STATES PATENT OFFICE 1,991,645

PROCESS OF DISTRIBUTING SOLIDS

Cornelius B. Woodward and Robert B. Keefe, Chicago, and Edwin W. Colt, Glen Ellyn, Ill., assignors to Armour and Company, Chicago, Ill., a corporation of Illinois Application September 17, 1931, Serial No. 563,350

12 Claims. (Cl. 91—68)

The present invention relates to the distribution of materials, and has particular reference to a process and apparatus for distributing finely divided solid particles such as adhesive or abrasive materials upon an appropriate carrier.

A principal object of our invention is a process and apparatus for providing a uniform and controlled covering of a finely divided material upon a carrier. An additional object is to coat a carrier, such as ply-board, with powdered albumen to form an adhesive surface thereon. Still another object is the impregnation of paper and the like provided with an adhesive material with an open coat of an abrasive material such as sand or garnet. These and other objects will become apparent from a consideration of the following description.

Heretofore considerable difficulty has been encountered in producing a satisfactory distribution of finely divided materials upon carriers. That is, it has been difficult to evenly distribute powdered or granular materials upon a surface to which such materials will adhere. This is particularly true in the case of powdered adhesive materials, such as albumen. Difficulties of somewhat similar nature are encountered in the abrasive industry, for example, in the production of open coat sandpaper.

In accordance with our invention, the finely divided material is passed from an appropriate hopper through spaced rollers, whereby an accurately determined amount of material is obtained. The powdered or granular material is allowed to fall into a stream of air. As a result an even distribution of the individual particles in the air is obtained. The air stream is then directed against an appropriate carrier upon which it is desired to effect a distribution of the solid particles.

In the drawings:

Fig. 1 is an end elevation, partly in section, of apparatus suitable for coating ply-board with powdered albument;

Fig. 2 is a side elevation of the device shown in Fig. 1; and

Fig. 3 is an end view, partly in section, of a modified form of apparatus particularly suitable for the production of sandpaper.

In the embodiment of the invention shown in the drawings, the frame structure of the apparatus is composed of timbers 10 having upwardly extending supporting members 11 which are connected by the horizontal bars 12.

Oppositely disposed on the bars 12 are adjustable bearing supporting members 13 having mounted thereon bearings 14. On each of the bearing supporting members 13 is provided a slidable bearing support 15 having an upwardly extending projection 16. This projection is provided with an opening into which is threaded the shaft of a micrometer adjusting device 17 having a hand-operated wheel 18. It is evident that by turning the wheel in one direction the slidable bearing support is caused to move forward while rotation of the wheel in the opposite direction effects a retraction of said slidable bearing support.

Mounted in the corresponding bearings 14 of the oppositely disposed bearing supporting members 13 are rollers 19. These rollers are driven by driven gears 20 meshing with a suitable driving gear, and their direction of rotation is clockwise, as shown by the arrows in Fig. 1. The direction of rotation may, however, be regulated in accordance with operating factors such as the size or nature of the material being distributed and speed of operation of the apparatus.

It is evident that by regulating the micrometer adjusting mechanism, the distance between the rolls may be varied, thereby accurately controlling the amount of materials which will pass therebetween. To produce an even distribution it is desirable to synchronize the two micrometer adjusting devices in order to insure a uniform space between the rollers.

In the distribution of finely divided materials, particularly those tending to become adhesive in the presence of moisture, it is desirable to provide the rollers 19 with heating means. As shown in Fig. 2, the hollow rollers may be provided in such instances with an inlet steam pipe 46 and an outlet or condensate pipe 47. The rollers are thus maintained at a sufficiently elevated temperature to preclude collection of moisture thereon, or to impart the desired elevation of temperature to the material being distributed.

Mounted upon rolls 19 are semi-circular bearing sleeves 20 which form a rigid support for the feed hopper 23. The feed hopper is provided with a sloping bottom terminating in an opening 22 which is located directly above the opening between rolls 19.

Extending vertically from bars 12 of the frame are rods 24 having nuts 25 and springs 26 positioned about the upper portions thereof. The bottom of springs 26 rest against the top of ears 27 through which rods 24 extend. Ears 27 are rigidly secured to the top of the feed hopper to form a support for the latter.

It is desirable that the hopper rest firmly against the feed rollers. The weight of the hopper and its contents assist in this respect, but it is preferred to regulate nuts 25 so that springs 26 exert presure to the ears 27, thereby pressing the feed hopper downwardly against the rolls.

Directly beneath the opening between the feed rollers are positioned air lines 28. These lines consist of supply pipes 29, extended manifold chambers 30, and nozzle portions 31, the latter being provided with outlet openings 32.

The air lines 28 direct streams of air downwardly through an adjustable discharge hopper which is made up of downwardly extending end plates 33, and adjustable side plates 34. Adjustment of the side plates is effected by regulating the position of bars 35 with respect to clamping screws 36, the latter being rigidly supported by bars 37 which are mounted on timbers 10 of the frame.

Where operation of the apparatus is constant it may be desirable to omit adjustment of the discharge hopper, but it is preferred to adjust at least one of the sides 34 in accordance with any particular operating conditions.

The side plates 34 are pivoted at their upper portion by means of hinges 38, the stationary portions of which are secured to the frame structure.

Hinges 39 are secured to the frame structure and to the expansion or manifold chambers 28, whereby said chambers may be pivoted to change or adjust the direction of the air streams through the discharge hopper.

In addition, hinges 38 and 39 cooperate, as shown in Figs. 1 and 2, to form a substantially dust tight connection between the air lines and the discharge hopper. These hinges and end plates 33 reduce loss of air and material being distributed to a minimum.

A traveling mechanism is mounted in the path of travel of air issuing from the discharge hopper, and serves to convey past the discharge hopper a carrier upon which it is desired to distribute the finely divided materials. The modification shown in Figs. 1 and 2 is particularly adapted for the coating of ply-board with powdered albumen, and consists of a stationary frame 40 having traveling chains 41 mounted thereon. Stops 42 may be provided to insure traction between the chains and the ply-board, the latter being illustrated at 43.

For producing open coat sandpaper, for example, a modified form of carrier-conveying mechanism is desirable. In Fig. 3 a continuous sheet of paper illustrated at 44 is caused to contact a glue coating roller 45 and then to pass upwardly through the particle-containing stream of air issuing from the discharge hopper. It is preferred that the angle of the paper with respect to the air stream be such that a pronounced glancing effect is produced. The exact angle of contact will in any case be adjusted in accordance with particular operating conditions and with the grade of paper desired.

As the angle of contact between the sheet and the stream of air from the discharge hopper approaches 90° a larger and more closely packed amount of particles will be deposited upon the carrier.

In operation, the feed hopper is filled with finely divided or powdered materials, such as powdered albumen. The feed rollers are then rotated to supply a curtain-like stream of solid particles to the discharge hopper. As these particles enter the discharge hopper they come in contact with streams of air from air nozzles 32. Consequently the particles are caught by the somewhat turbulent air streams and incorporated therein. By the time the air stream has reached the outlet end of the discharge hopper, the solid particles are evenly distributed therein, and when the air stream strikes the wet ply-board or other carrier having an affinity for the solid particles, an evenly distributed coating results.

It is important for obtaining the best results that the operation of the apparatus be maintained as constant as possible.

It is also desirable that the apparatus be sufficiently rigid to prevent an inconstant flow of materials. The firm seating of the feed hopper upon the feed rolls materially assists in this respect.

The micrometer adjustment of the feed rolls allows an accurate control of the distance therebetween. As the distance between the rolls may be only a few thousands of an inch, a small variation will be reflected by a change in the character of the finished product.

In a compressed air mechanism the pressure and consequently the supply of air is apt to fluctuate with fluctuations in the compression apparatus. It will be seen that such fluctuations in the air stream results in a finished product which is not of constant character. It is our discovery that such fluctuations in the air supply may be offset by employing two air streams such as the converging streams shown in the drawings.

In a desirable mode of operation, one of the air nozzles is provided with openings sufficiently large to supply the requisite amount of air for properly distributing the materials while the other air nozzle is merely "cracked", that is, it is provided with small openings whereby a limited quantity of air is blended with the major air stream. This small air stream has a steadying influence upon the major air stream and permits an even distribution of the finely divided materials.

In normal operation, the air pressure employed may be between 1 and 10 pounds, depending upon the result desired.

The air issuing from the nozzles is deflected from the sides of the discharge hopper to create sufficient turbulence to insure even distribution of the solid particles. Thus the sides of the discharge hopper, act to a certain extent as baffles. Other baffle arrangements may be used if desired.

By pivoting the sides of the discharge hopper at their upper portion, the cross sectional area of the hopper may be reduced toward the outlet end, to increast the speed of the particle-containing air stream. Once the desired position is determined the same may be maintained constant by tightening the clamping screw 36.

From the foregoing illustrative description it will be seen that our process and apparatus are susceptible of various changes, and such modifications as come within the spirit of our invention are intended to be included in tht appended claims.

We claim:

1. The process of coating a carrier with small particles which consists in permitting a curtain of uniform density of the particles to fall into the angle of confluence between converging air streams to cause a uniform distribution of the particles in the gas and directing the particle-laden air downwardly upon said carrier.

2. The process of coating a carrier with small particles, which consists in feeding the carrier surface with an adhesive, propelling the carrier adjacent a hopper containing the particles, feeding a controlled curtain of the particles of uniform density into the angle of confluence between converging air streams to cause a uniform distribution of the particles in the gas, and causing the resultant particle-laden air stream to impinge downwardly upon the treated surface of the carrier.

3. The process of distributing finely divided solids on a carrier, which comprises forming a controlled curtain of falling finely divided solids in uniform distribution, directing converging streams of relatively high velocity gas against said curtain of solids to form a substantially uniform distribution of particles in said gas, providing a carrier for said solids, and directing a relatively slow moving curtain of said particle-containing gas downwardly against said carrier.

4. The process of distributing finely divided solids on a carrier, which comprises forming a relatively wide falling curtain of finely divided solids in uniform distribution, directing a stream of compressed air against said falling curtain of finely divided solids to form a substantially uniform distribution of particles in said air, providing a carrier of substantially the same width as the width of said falling curtain, directing a stream of said particle-laden air upon said carrier, and controlling the stream of particle laden air at the point of application to the carrier.

5. The process of distributing finely divided solids on a carrier, which comprises providing a controlled falling curtain of said solids in uniform distribution and of a width corresponding to the width of the carrier, directing converging streams of compressed air of substantially the same width as the width of the carrier against said falling curtain of finely divided solids to form a substantially uniform distribution of particles in said air, and directing a curtain of said particle-laden air against said carrier over substantially its entire width.

6. The process of distributing finely divided solids on a carrier, which comprises forming a controlled curtain of falling finely divided solids in uniform distribution, directing in a confined space converging streams of relatively high velocity gas against the curtain of solids to cause substantially uniform distribution of particles in the gas, providing a carrier for the solids, directing a relatively slow moving curtain of the particle-laden gas downwardly against said carrier, and controlling the stream of particle-laden gas at the point of application to the carrier.

7. The process of distributing finely divided solids on a carrier, which comprises forming a controlled curtain of falling finely divided solids, directing in a confined space a stream of relatively high velocity gas against said curtain of solids and producing a turbulent condition in said gas to form a substantially uniform distribution of particles in said gas, providing a carrier for said solids, and directing a relatively slow moving stream of said particle-containing gas downwardly against said carrier.

8. The process of distributing finely divided solids on a carrier, which comprises forming a relatively wide falling curtain of finely divided solids, directing a stream of compressed air against said falling curtain of finely divided solids and creating a turbulent condition in said air to form a substantially uniform distribution of particles in said air, providing a carrier of substantially the same width as the width of said falling curtain, and directing a stream of said particle-laden air upon said carrier.

9. The process of distributing finely divided solids on a carrier, which comprises providing a controlled falling curtain of said solids of a width corresponding to the width of the carrier, directing a stream of compressed air of substantially the same width as the width of the carrier against said falling curtain of finely divided solids and producing a turbulent condition in said air to form a substantially uniform distribution of particles in said air, and directing a stream of said particle-laden air against said carrier over substantially its entire width.

10. The process of making sandpaper which consists in feeding a carrier surface with an adhesive, propelling the carrier adjacent a hopper containing abrasive particles, feeding a controlled curtain of the abrasive particles of uniform density into the angle of confluence between converging air streams to cause a uniform distribution of the particles in the gas, and causing the resultant particle-laden air stream to impinge upon the treated surface of the carrier.

11. The process of distributing finely divided particles of abrasive on a carrier to form sandpaper, which comprises forming a controlled curtain of falling finely divided abrasive solids in uniform distribution, directing in a confined space converging streams of relatively high velocity gas against the curtain of abrasive particles to cause substantially uniform distribution of the abrasive in the gas, providing a carrier for the solids, directing a relatively slow moving curtain of the particle laden gas downwardly against the carrier, and controlling the stream of abrasive laden gas at the point of application to the carrier.

12. The process of producing sandpaper, which comprises forming a controlled curtain of falling finely divided particles of an abrasive, directing in a confined space a stream of relatively high velocity gas against said curtain of particles of an abrasive and producing a turbulent condition in said gas to form a substantially uniform distribution of said abrasive particles in said gas, providing a flexible carrier for said abrasive, providing said carrier with an adhesive, and directing a relatively slow-moving stream of said particle-containing gas against said carrier.

CORNELIUS B. WOODWARD.
ROBERT B. KEEFE.
EDWIN W. COLT.